Figure 3:
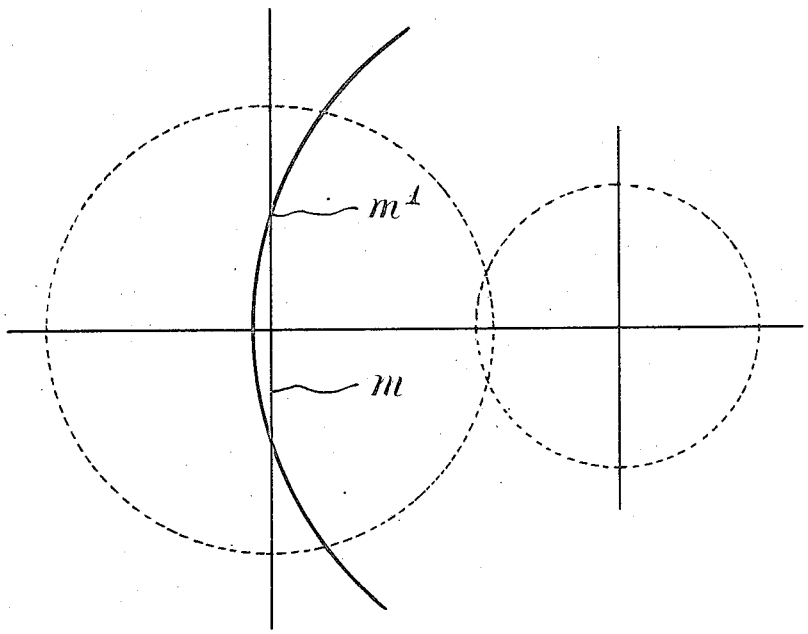

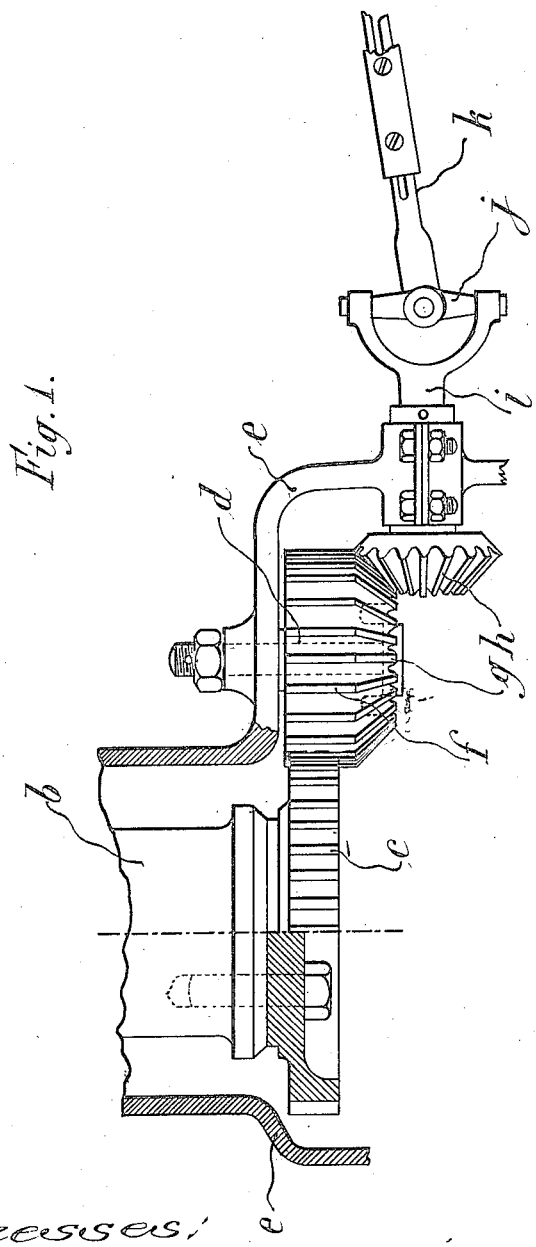

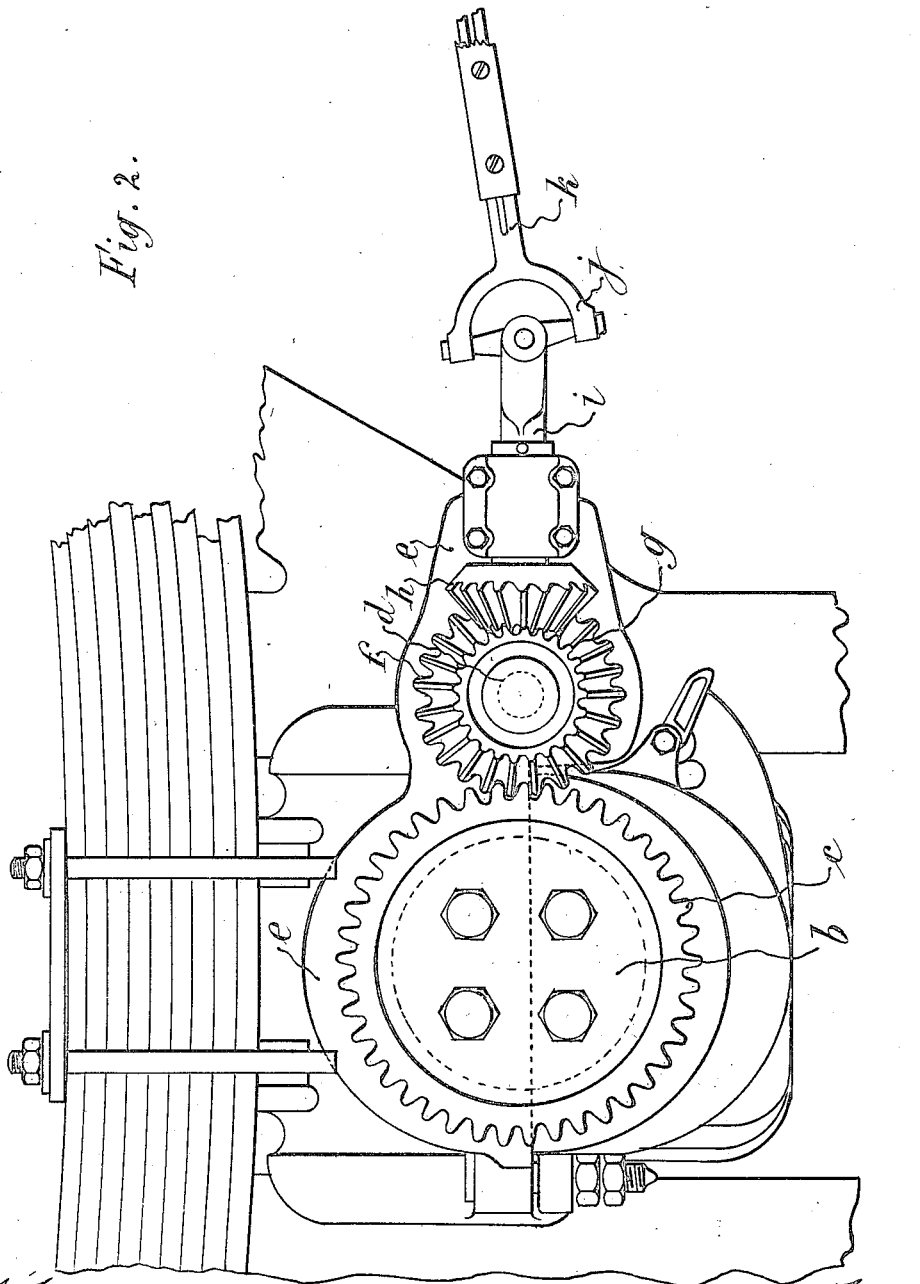

Mar. 20, 1923. 1,449,263
P. BOSSU
MEANS FOR TRANSMITTING MOTION
Filed Dec. 28, 1918 4 sheets-sheet 3
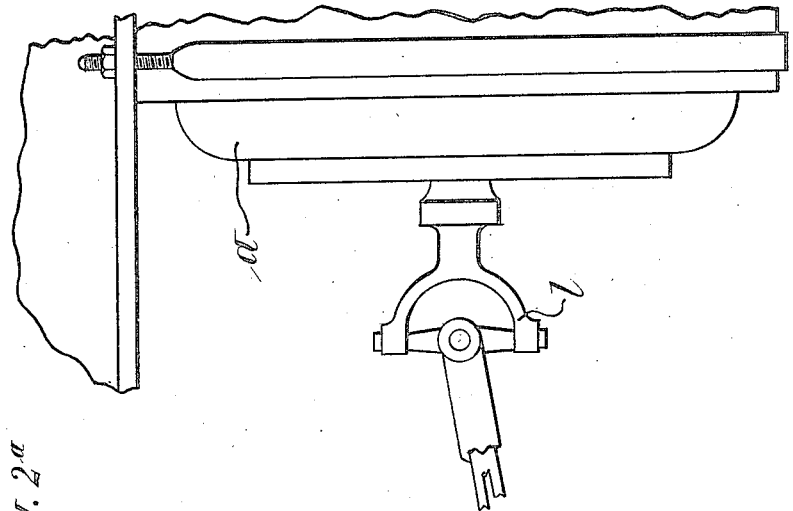
Fig. 2ª
Witnesses:
Norris L. Sumby.
Inventor
Pierre Bossu
by
Attorney Patented Mar. 20, 1923.

1,449,263

UNITED STATES PATENT OFFICE.

PIERRE BOSSU, OF NEUILLY-SUR-SEINE, FRANCE, ASSIGNOR TO SOCIETE ANONYME DES ETABLISSEMENTS L. BLERIOT, OF PARIS, FRANCE.

MEANS FOR TRANSMITTING MOTION.

Application filed December 28, 1918. Serial No. 268,701.

*To all whom it may concern:*

Be it known that I, PIERRE BOSSU, citizen of the French Republic, residing at Neuilly-sur-Seine, Department of Seine, France, have invented certain new and useful Improvements in Means for Transmitting Motion, of which the following is a specification.

The invention relates to means for transmitting motion from one rotatory member to another and is particularly adapted to be interposed between the axle of a vehicle running on rails and a machine, such as a dynamo for lighting purposes adapted to be driven by the rotation of said axle.

It has for its object to locate on a railway car a transmission device at a place where it can easily be taken apart and repaired, and to construct such transmission device so as to eliminate the difficulties ordinarily rising from the wearing out of the bearings of the common axle of the usual pair of running wheels of the railway car. Usually the transmission devices of this kind comprise a spur wheel placed inside of the running wheels such spur wheel being definitely fastened to the common axle of said running wheels. Such arrangement makes it necessary to construct said spur wheel of two halves wherefrom arise practical difficulties, so much the greater as the inner part of said common axle is ordinarily rough. Other difficulties arise from the wearing out of the bearings of the common axle which wearing out causes a gradual increase of the distance between the two axes of the mutually meshing spur wheels, it being supposed that this distance is, as usual, placed substantially on a horizontal line.

In accordance with this invention two mutually meshing spur toothed wheels are employed, one of which is keyed on one of the outer ends of the common axle of a pair of wheels of a railway car, and the other is rotatably mounted adjacent thereto, say on the lubricator casing of the bearing of the said axle, the normal distance between the axes of these wheels being preferably such that it is slightly less than the sum of the radii of the pitch-circles of the two toothed wheels.

The invention will, however, be understood from the following description, and the accompanying drawing, which, however, are given merely by way of example.

Figure 1 shows diagrammatically in plan a transmission device according to this invention.

Figures 2 and 2$^a$ show, in elevation, the same device.

Figure 3 is a descriptive diagram.

The embodiment of the invention illustrated in the drawings is shown as applied to a railroad vehicle and a lighting dynamo $a$, in which the dynamo is to be driven by the axle $b$ of the vehicle.

A spur wheel having straight teeth $c$ is secured to the end of the axle $b$.

A second spur wheel $f$ is mounted loosely on a shaft or journal pin $d$, secured to the gear box or lubricator casing $e$ of the axle, so that the spur wheel $f$ meshes with the wheel $c$, the wheel $f$ being given such a width that it will remain in gear with the wheel $c$ whatever may be the lateral movements of the axle.

The said wheel $f$ carries a bevel wheel $g$ which may be integral with the wheel $f$.

The wheel $g$ engages with a conical pinion $h$ on a shaft $i$ mounted in bearings in a support fixed to the cover of the gear box.

This shaft is connected by a universal joint $j$ to a rod $k$, which is itself connected by a universal joint $l$ to the shaft of the dynamo $a$.

Preferably the distance between the shaft $d$ and the centre of the axle $b$, is such that it is slightly less than the sum of the radii of the pitch circles of the two toothed wheels $c$ and $f$, with the result that when, owing to the wear of the bearings, the axle $b$ becomes displaced vertically in the direction of the line $m$, $m^1$ of Figure 3 until the axle $b$ reaches the point $m^1$, where the distance between the axle $b$ and axle $d$ is equal to the sum of the radii of the pitch circles of the spur wheels $c$ and $f$, the function of the spur wheels is correct, and during the displacement of the axle $b$ from the point $m$ to the point $m^1$ the toothed wheels are somewhat too near one to the other which fact has however practically no drawback. The shortest distance between the axes is attained with an average wearing out of the bearings, the said distance being then on a horizontal line. It follows that the axle $b$ can become displaced vertically to a relatively large extent, without the transmission being practically interfered with.

As will be understood, the invention is not limited in any way to the embodiment more particularly indicated, but includes on the contrary, all modifications.

Having now particularly described and ascertained the nature of my said invention and in what manner the same is to be carried out, I declare that what I claim is:—

In transmission mechanism, the combination with the axle of the running wheels of a railway car, bearing boxes for said axle, and a dynamo mounted on said car, of a driving spur wheel secured to one end of the axle and located in one of said bearing boxes, a journal pin mounted in one of said bearing boxes, a driven spur wheel rotatably mounted on said pin and meshing with said driving wheel, said driven spur wheel having a beveled portion formed integral therewith, teeth on said beveled portion, a shaft passing through and journaled in said bearing box, a second bevel pinion secured to one end of said shaft and meshing with the teeth of said bevel portion within the bearing box, the other end of said shaft being connected to the dynamo, whereby said bearing box serves as a casing for the gearing.

In testimony whereof I have hereunto set my hand in presence of two subscribing witnesses.

PIERRE BOSSU.

Witnesses:
 J. JULIUS.
 JOHN F. SIMONS.